UNITED STATES PATENT OFFICE.

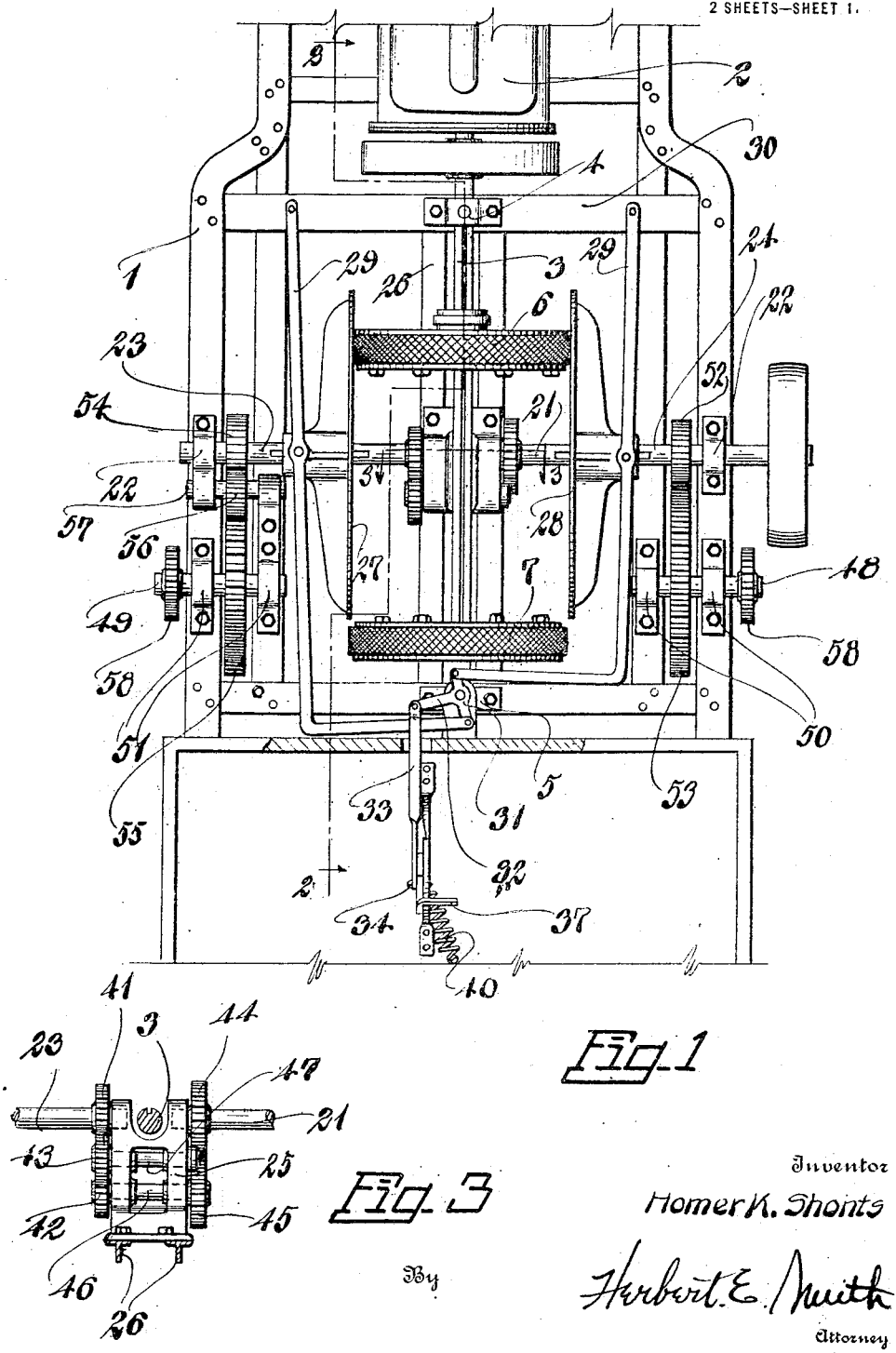

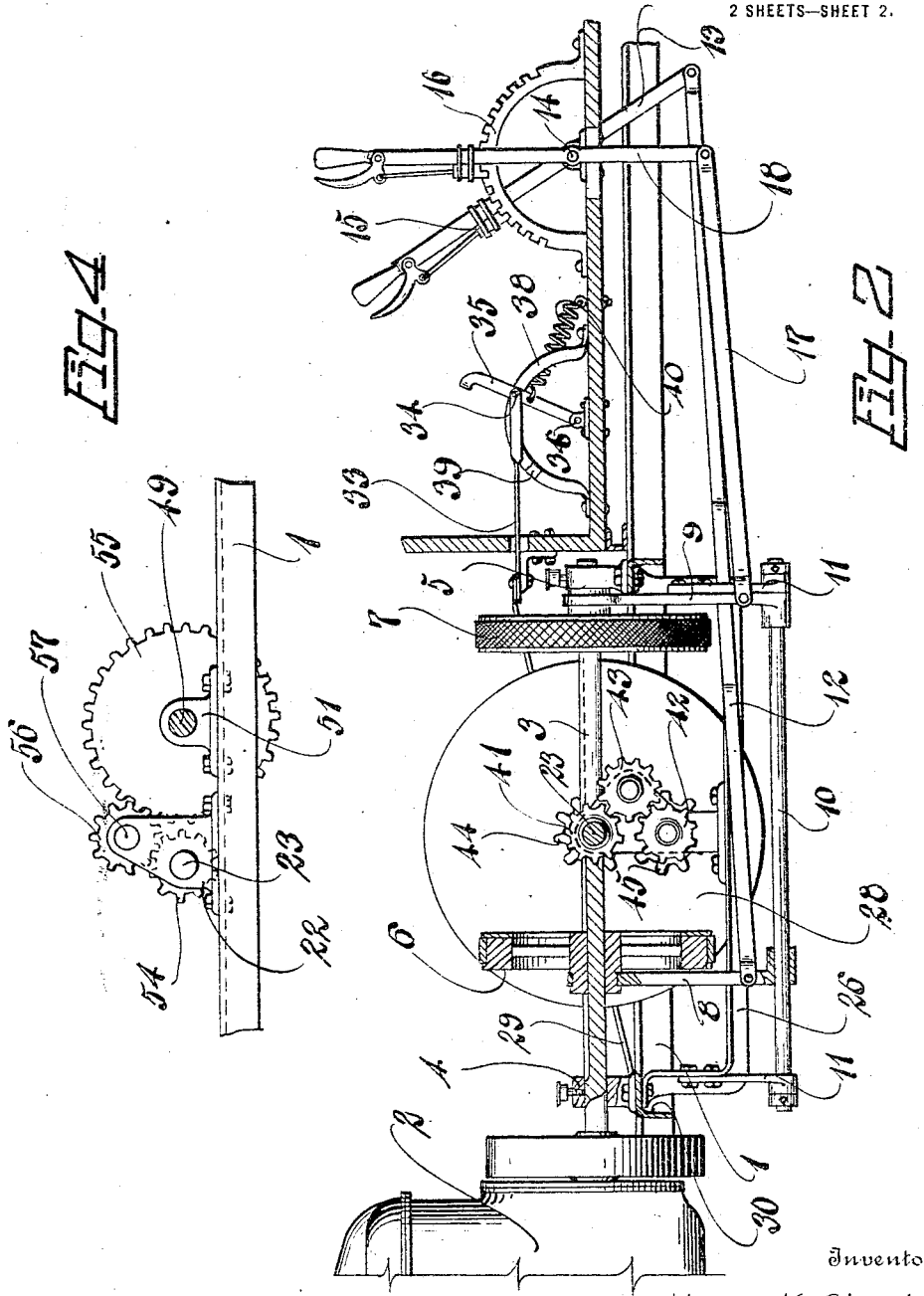

HOMER K. SHONTS, OF SPOKANE, WASHINGTON.

FRICTION-DRIVE FOR MOTOR-VEHICLES.

1,288,238.   Specification of Letters Patent.   Patented Dec. 17, 1918.

Application filed February 10, 1917. Serial No. 147,814.

*To all whom it may concern:*

Be it known that I, HOMER K. SHONTS, a citizen of the United States, residing at Spokane, in the county of Spokane and State of Washington, have invented certain new and useful Improvements in Friction-Drives for Motor-Vehicles, of which the following is a specification.

This invention relates to new and useful improvements in friction drives for motor vehicles, more especially auto trucks, tractors and the like, and the primary object of the invention is to provide an improved driving mechanism which is so constructed and designed as to gain a maximum power with a minimum amount of movement.

A further object of the invention resides in providing a device which is constructed to utilize a pair of disks in connection with the friction drive wheel, whereby to equalize the strain and utilize the full amount of power, which is not possible where a single disk is used.

Still another object of the invention resides in providing a pair of friction drive wheels operating in connection with the disks to enable forward and reverse movement and a still further object resides in providing an improved means for operating the drive wheels longitudinally of the machine and the driving disks laterally thereof.

Another object resides in providing a device which is compact in construction, inexpensive to manufacture and one which will be extremely efficient in use.

With these and other objects in view my invention consists in the novel features of construction, combination and arrangement of parts, as will be hereinafter referred to and more particularly pointed out in the specification and claim.

In the accompanying drawings forming a part of this application:

Figure 1 is a plan view of the driving mechanism constructed in accordance with my invention and applied to use on a truck frame or tractor.

Fig. 2 is a side elevation thereof, parts being disclosed in section upon line 2—2 of Fig. 1.

Fig. 3 is a section as seen on line 3—3 of Fig. 1.

Fig. 4 is an elevation of the driving gears mounted upon the left hand side of the frame.

In describing the invention I shall refer to the drawings in which similar reference characters designate corresponding parts throughout the several views, and in which 1 designates a frame of an automobile truck or other tractor upon which is mounted a suitable engine 2, the latter being provided with a drive shaft 3 which, as shown in the drawings, is formed to run laterally of the frame and is provided with supporting journals 4 and 5 attached to said frame. Keyed for sliding movement on the shaft 3 are the friction drive wheels 6 and 7 with which are engaged the depending shifters 8 and 9, respectively. These shifters are slidably arranged on the shifting rod 10 which extends longitudinally of the frame and is suspended therebelow in bearings 11. Engaging the shifting rod 8 is a connecting link 12 connecting on the opposite end with the hand lever 13 fulcrumed at 14 and provided with latch means 15 engaging a tooth segment 16 for positioning the friction wheel 6 in any desired position with respect to the driving disks. The shifter 9 is engaged by a link member 17 and connects with a fulcrumed hand lever 18 for operation of the disk 7 and provides for adjustment in the same manner as that for the friction wheel 6.

As stated above, the shaft 3 is supported longitudinally of the frame in suitable bearings and the friction wheels are slidably mounted thereupon. A shaft 21 extending transversely of the frame is rotatably mounted in bearings 22 and is formed in two sections, respectively, designated as 23 and 24, 23 and 24 being supported upon their inner ends, respectively, in the housing 25 mounted upon the transverse supporting members 26 attached to the frame 1. Mounted for sliding movement upon the shaft 21 are the friction disks 27 and 28, the disks are keyed to the shaft 21 as clearly shown in Fig. 1 of the drawings, and capable of movement thereon. The disks 27 and 28 adapted for movement upon the shaft 21 are designed to be brought inwardly for frictional engagement with the wheels 6 and 7, one at a time, depending upon the desired direction and in order to move these disks on the shaft, a pair of levers 29 of L-shaped design are fulcrumed at their outer ends on a transverse bar 30 of the frame 1. These fulcrumed levers loosely engage the disk hubs intermediate the ends of said levers and the opposite ends of the same are engaged pivotally with the fulcrumed lever 31 on opposite sides of the fulcrum point thereof. This lever is arranged to move in a horizontal plane on the frame and is provided with an extending arm 32 whereby to provide a connection with a link 33, said link extending to a pivotal connection 34 upon a foot lever 35 fulcrumed at 36 and attached to the frame or body of the tractor. The foot lever is provided with the usual foot engaging portion 37 and is operated in close proximity to a segment portion 38, also attached to the frame or body of the mechanism. Upon the segmental portion 38, at 39, is a spur or engaging member projecting into the path of movement of the lever 35 to engage said lever and maintain the disks 27 and 28 distant from engagement with either of the friction wheels 6 or 7. The slight pressure upon the foot lever to one side will serve to release this engagement which holds the disks separated from the friction wheel and a spring 40 engaging the lever on the one end and the frame 1 on the other will always be under tension to maintain the disk wheels in engagement with one or the other of the friction wheels at all other times. Thus the disks may be moved inwardly or outwardly with respect to the friction wheels and the friction wheels are capable of movement nearer or farther from the centers of said disks, according to the speed desired.

In view of the fact that two disks are provided and positioned on opposite sides of the friction wheels, some means must be provided other than a key construction to provide means for rotating both disks in the same direction. As stated previously, the disks are keyed to the shaft 21, but said shaft is divided into two shaft portions 23 and 24 and being engaged at their nearest point by a bearing member 25. Adjacent the bearing 25 upon the shaft 23 is provided a gear 41. Supported by the central bearing 25 are shafts 46 and 47. The shaft 46 is engaged on one end by the gear 42 and the shaft 47 by the gear 43. The gear 41 meshes with 43 and the gear 43 with the gear 42 which imparts to the shaft 46 a movement in the same direction as the shaft 23. Upon the opposite side of the bearing 25 and upon the shaft 24 adjacent the bearing thereof is positioned a gear 44 meshing with the gear 45 attached to one end of the shaft 46. The entraining of the gears 44 and 45 will allow a reverse motion of the shaft 24 to the direction of rotation of the shaft 23 and as the gears are provided to maintain the same relative revolutions of the shafts it is evident that the disks 27 and 28 will be capable of being rotated by the friction wheels at a constant speed and that the driving power transmitted to the disks will be constant on either of the shafts 23 and 24.

Now as it is evident that the shafts 23 and 24 are rotated in opposite directions and as the application of power is to be applied to the traction wheels for motor vehicles, it is evident that some means must be taken to provide a constant movement of the drive shaft in one direction upon both sides of the machine. To provide this, counter-driving shafts 48 and 49 are provided being journaled to the frame 1 by suitable bearings 50 and 51. Upon the shaft 24 is mounted a gear 52 meshing with a gear 53 supported upon the shaft 48 and upon the shaft 23 is mounted a gear 54 and upon the shaft 49 a gear 55. Positioned between the gears 54 and 55 is mounted a gear 56 and meshing with both gears and providing movement in the same direction with the shaft 23. The gear 56 is mounted upon a stub shaft 57 journaled into extensions of the journals 22 and 51. It will be evident that as the shafts 23 and 24 will be revolved in opposite directions the entrained gears 52 and 53 will impart reverse motion to the shaft 48 and the gears 54, 55 and 56 will impart a motion to the shaft 49 in the same direction as that of 23 which will also be in the same direction as that of 48. The outer ends of the shafts 48 and 49 may be provided with sprockets 58 or any other desired form of engaging means so that the power may be transmitted to any other operating parts and it will be seen that the device complete is extremely compact and capable of obtaining a maximum power from a minimum amount of movement.

From the foregoing it will be seen that I have provided a simple, inexpensive and efficient means for carrying out the objects of the invention, and while I have particularly described the elements best adapted to perform the functions set forth, it is obvious that various changes in the form, proportion and in the minor details of construction, may be resorted to, without departing from the spirit or sacrificing any of the principles of the invention.

I claim:—

The combination with a frame, a drive shaft and a pair of friction wheels slidable thereon, of a transverse sectional shaft having a gear at the inner end of each section, a train of gears between the sections and said end gears connected therewith as described, a pair of slidable friction disks on the sectional shaft adapted to selectively engage the friction wheels, a three arm lever pivoted in the frame, a pair of levers for the disks actuated through the three arm lever, a spring-pressed foot lever connected to the three arm lever, gear transmission means on the end of each shaft section.

In testimony whereof I affix my signature.

HOMER K. SHONTS.

Copies of this patent may be obtained for five cents each, by addressing the "Commissioner of Patents, Washington, D. C."